(12) United States Patent
Bradford

(10) Patent No.: US 6,367,858 B1
(45) Date of Patent: Apr. 9, 2002

(54) TRUCK BED EXTENDER

(76) Inventor: Lance C. Bradford, 7211 Venosa Pl., Rancho Cucamonga, CA (US) 91701

( * ) Notice: Subject to any disclaimer, the term of this patent is extended or adjusted under 35 U.S.C. 154(b) by 0 days.

(21) Appl. No.: 09/699,536

(22) Filed: Oct. 30, 2000

(51) Int. Cl.[7] .............................. B60P 3/34; B62C 1/06; B62D 33/08
(52) U.S. Cl. ................. 296/26.09; 296/26.11; 296/57.1
(58) Field of Search .................. 296/26.08, 26.09, 296/26.1, 26.11, 57.1, 183

(56) References Cited

U.S. PATENT DOCUMENTS

| | | | |
|---|---|---|---|
| 4,778,213 A | 10/1988 | Palmer | 296/26 |
| 5,456,511 A | 10/1995 | Webber | 296/26 |
| 5,669,654 A * | 9/1997 | Eilers et al. | |
| 5,924,753 A | 7/1999 | DiBassie | 296/26.09 |
| 6,193,294 B1 * | 2/2001 | Disner et al. | |

* cited by examiner

Primary Examiner—Joseph D. Pape
Assistant Examiner—Scott Carpenter

(57) ABSTRACT

An assembly for extending the length of a truck bed, which can increase the cargo space of the truck bed. The truck bed extension assembly of the present invention can be integrally incorporated into the side walls of the truck bed. The extension assembly substantially maintains the side-to-side useable space within the original truck bed.

14 Claims, 5 Drawing Sheets

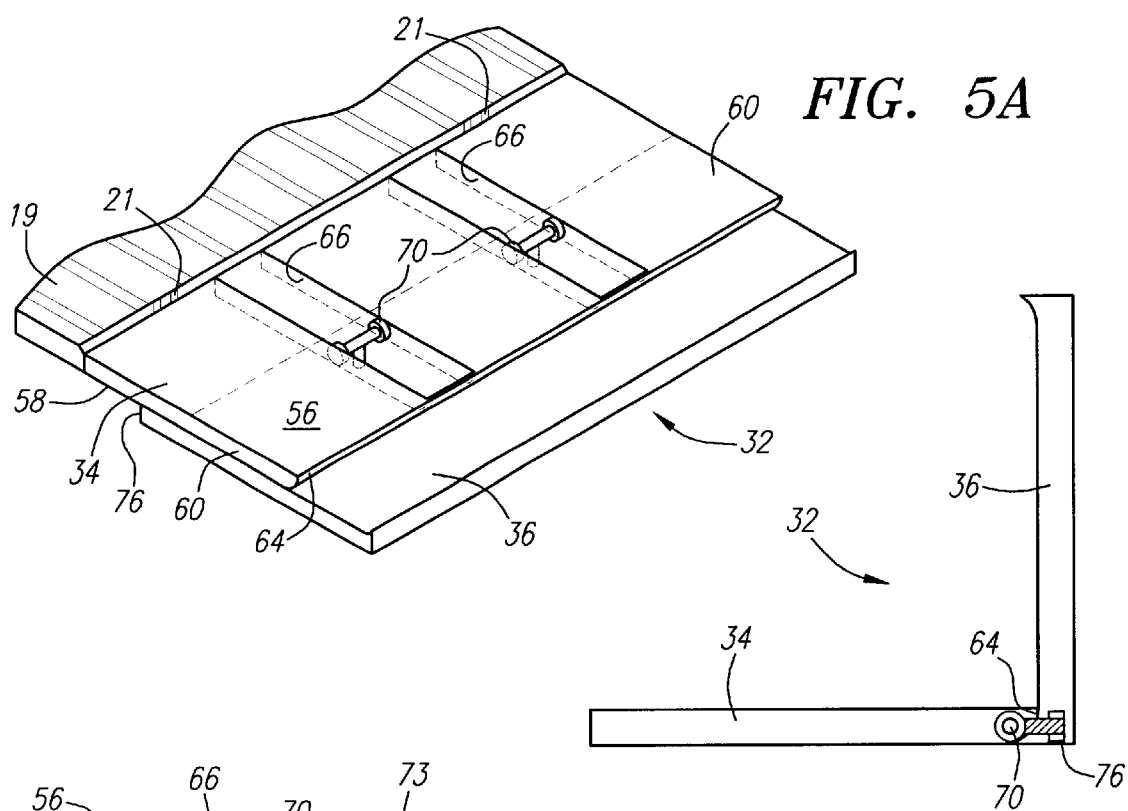
FIG. 5A
FIG. 5B
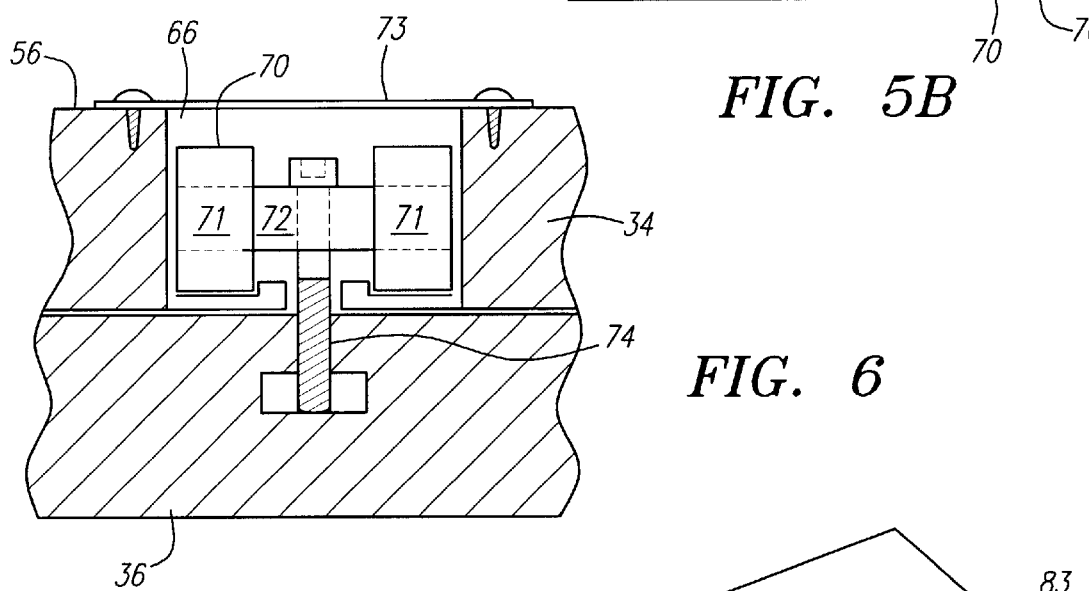
FIG. 6
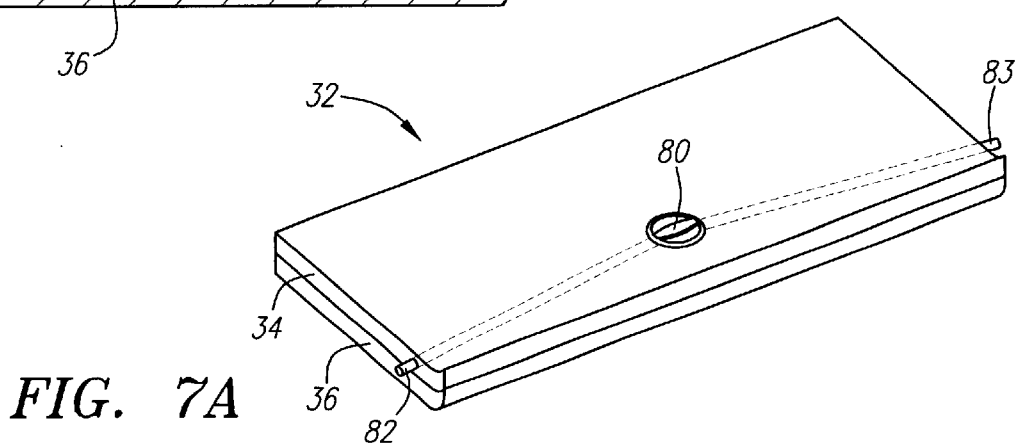
FIG. 7A

TRUCK BED EXTENDER

BACKGROUND OF THE INVENTION

1. Field of the Invention

The present invention relates to accessories for trucks, and more particularly to a pick-up truck cargo bed extender.

2. Description of the Related Art

When transporting items in a truck cargo bed, one or more of those items may be too long to fit within the bed and therefore requires extra space. The use of aftermarket or add-on extension devices to lengthen the pick-up truck cargo space is known in the art. For example, U.S. Pat. No. 4,778,213 to Palmer discloses an extendable vehicle tailgate assembly; U.S. Pat. No. 5,456,511 to Webber discloses a rigid frame adapted to be coupled to opposite sidewalls of the truck bed; and U.S. Pat. No. 5,924,753 to DiBassie discloses extendible side braces, which bolt to the inner side of the truck bed.

Unfortunately, although aftermarket or add-on extension devices may be adequate to increase the length of the truck bed, some extension devices tend to be bulky and thus reduce the amount of useable space from side-to side within the cargo bed. Typically, after-market truck bed extenders, require modification to the truck bed, which may be costly, unsightly, and permanent. In some instances, truck bed extenders can obstruct a driver's ability to see safety lamps and/or taillights located near the extended portion of the cargo bed.

Therefore, it can be appreciated that there exists a continuing need for a new and improved truck bed extender, which can be used for extending a cargo bed of a truck to increase its useable cargo space, while being safe, attractive, and easy to operate.

SUMMARY OF THE INVENTION

The present invention provides an assembly for extending the length of a truck bed, which can increase the cargo space of the truck bed. Advantageously, the truck bed extension assembly of the present invention can be integrally incorporated into the sidewalls of the truck bed. In this manner, the extension assembly substantially maintains the side-to-side useable space within the original truck bed.

In one aspect of the present invention, a truck bed extension assembly is provided for extending a bed of a truck. The assembly includes a first panel and a second panel. Each panel is moveable between a first position, where each of the panels are held within the truck side walls, and a second position, where each of the panels is extended out from within the side walls.

In another aspect of the present invention, provided is a truck bed extension system. The system includes a truck bed, which has a front wall, a bottom wall, and oppositely facing side walls. A tailgate is hingedly coupled to a wall of the truck bed. A pair of telescopically extendable panels are included in the system. Each panel is movable between a retracted position, where the panels are disposed within each side wall, and an extended position, where each panel extends rearwardly from the side walls, approximately the distance of the lowered tailgate.

In yet another aspect of the invention, a method is provided for extending a truck bed, which has a front wall, a bottom wall, and oppositely facing side walls. The method includes sliding a pair of extendable panels telescopically movable between a retracted position disposed within each side wall and an extended position extending rearwardly from the side walls; and actuating a tailgate hingedly coupled to a wall of the truck bed to form an extended bottom wall portion.

The present invention is advantageous in that it does not require add-on extension devices, so that the amount of useable space from side-to side within the truck bed is maintained, while the front-to-back space is increased. The truck bed extender of the present invention can be formed integrally with the truck bed, so that aftermarket modifications to the truck bed, which may be costly, unsightly, and permanent, are unnecessary. The present invention does not obstruct a driver's ability to see safety lamps and/or taillights, since the lamps and/or taillights can extend with the truck bed extender.

Beneficially, since the truck bed extender of the present invention can be formed integrally within the truck bed walls, the truck bed can be used in a non-extended configuration without having to remove the truck bed extender, and while maintaining the original truck bed volume and carrying capacity.

Other uses, advantages, and variations of the present invention will be apparent to one of ordinary skill in the art upon reading this disclosure and accompanying drawings.

BRIEF DESCRIPTION OF THE DRAWINGS

FIG. 5A is a simplified perspective view of an embodiment of a tailgate assembly in accordance with the present invention;

FIG. 5B is a simplified side-view of the tailgate assembly of FIG. 5A;

FIG. 6 is a simplified view of an embodiment of a roller device for use in the tailgate assembly of FIGS. 5A and 5B;

FIG. 7A is a simplified perspective view of an embodiment of the tailgate assembly in accordance with the present invention;

DETAILED DESCRIPTION

FIGS. 1A–1D are simplified perspective illustrations of truck bed extension system 10 (hereinafter "extension system 10") and the major components of truck bed extension assembly 12 (hereinafter "extension assembly 12").

Figure 1A:
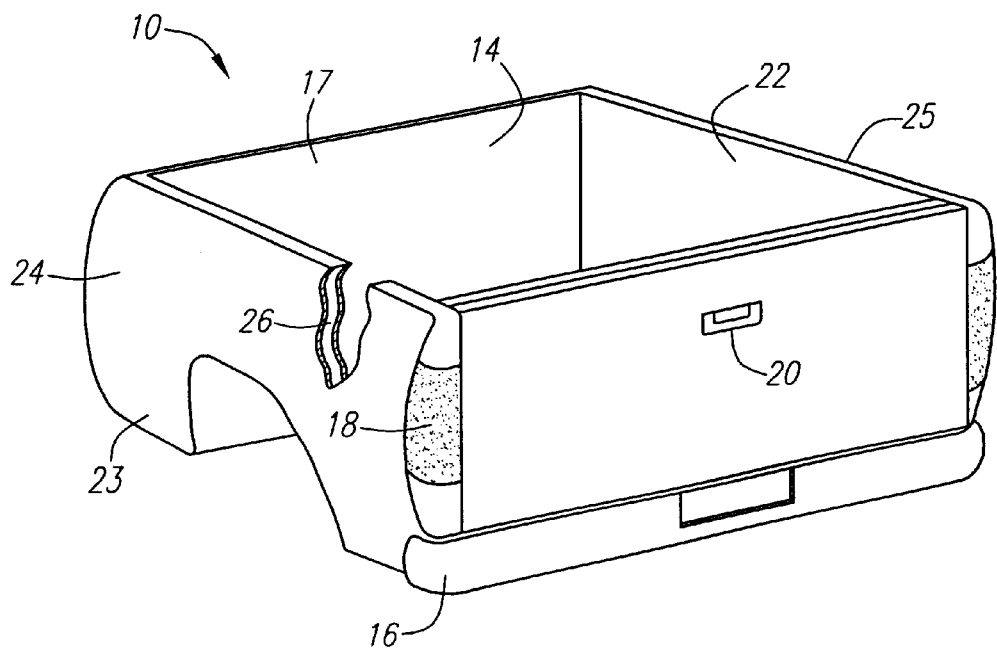
FIG. 1A is a simplified perspective view of a truck bed in accordance with an embodiment of the present invention.

As shown in FIG. 1A, the major components of extension system 10 include truck bed 14, bumper 16, safety lamps (also known as taillights) 18, and tailgate handle 20. Truck bed 14 includes a front wall 17, and bottom wall 19, inwardly facing, opposed internal walls 22 and outwardly facing external walls 24. Internal walls 22 and corresponding outwardly facing external walls 24, in combination form side walls 23 and 25. Internal walls 22 and external walls 24 define a hollow portion 26, typically formed between the walls during the fabrication of truck bed 14. As described in greater detail below, in an embodiment of the present invention, hollow portion 26 houses a portion of extension assembly 12. Truck bed 14 can be formed of metal or other similarly rigid structural material, using well-known molding, pressing, and machining techniques commonly used in the fabrication of trucks and automobiles.

Figure 1B:
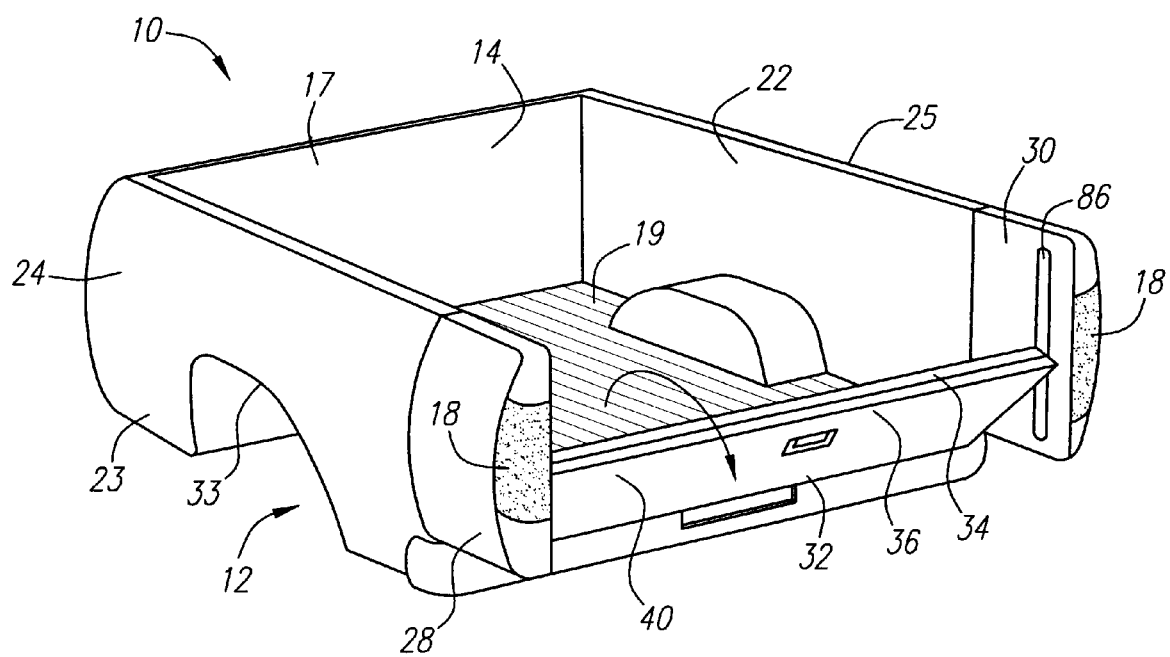
FIG. 1B is a simplified perspective view of the truck bed in a partially extended position in accordance with an embodiment of the present invention.

As shown in FIG. 1B, extension assembly 12 includes extension panels 28 and 30 and tailgate assembly 32. The description of extension panels 28 and 30 is directed to only one side of extension assembly 12 (e.g. side wall 23), with reference to the other side, only when necessary to describe a feature of the invention, since it is understood that the other extension panel is structurally and functionally the same.

Figure 1C:
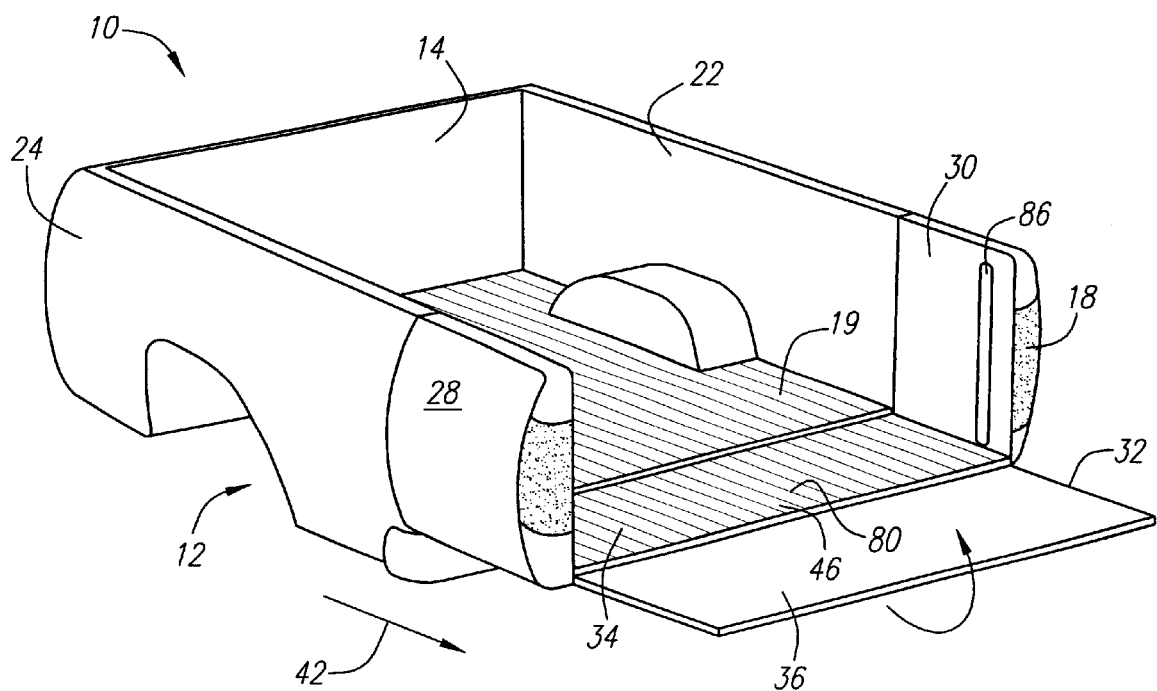
FIG. 1C is a simplified perspective view of the truck bed in a fully extended position with tailgate down in accordance with an embodiment of the present invention.

Extension panel 28 slidingly fits into side wall 23 as illustrated in FIG. 1C. In accordance with the present invention, extension panel 28 is slidable within side wall 23, such that panel 28 is removably insertable and housed in hollow portion 26. Each extension panel 28 and 30 may be formed having a shape, which corresponds to the cross-sectional shape of hollow portion 26. It should be understood that extension panel 28 is intended to be custom designed to fit any truck bed, thus dimensions of panel 28 can vary. For example, the length of extension panel 28 depends upon the make and model of truck bed 14. In one embodiment, the length of panel 28 is approximately the length of tailgate assembly 32. However, since extension panel 28 is inserted into hollow portion 26, the length of the extension panel is not so long as to interfere or obstruct wheel well 33.

Extension panel 28 includes a distal end towards front wall 17 and a proximal end toward tailgate assembly 32. On the proximal end of extension panel 28 is mounted at least one safety lamp 18. Safety lamp 18 extends out with extension panel 28. Since safety lamp 18 can extend as the extension panel 28 extends, the safety lamp is not obstructed so that its effectiveness is not diminished.

In one embodiment, extension panel 28 can be a hollow panel, which is formed by welding, riveting or similarly joining to separate panels. Alternatively, extension panel 28 can be formed as a single hollow panel either by molding or extruding or similar fabrication techniques. Extension panel 28 can be made of strong lightweight material, such as sheetmetal, polyurea, urethane fiberglass mix, carbon fiber, and aluminum.

Figure 2:
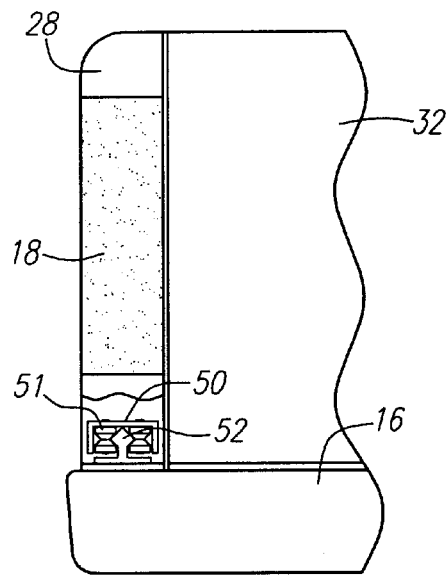
FIG. 2 is a simplified partial rear-view of the truck bed of the present invention.
Figure 3:
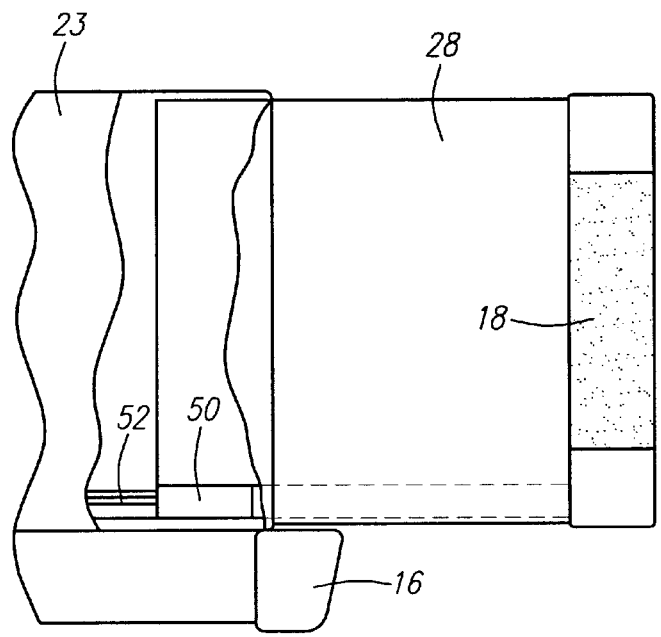
FIG. 3 is a simplified partial side-view of the truck bed of the present invention.

As shown in FIGS. 2 and 3, extension panel 28 is coupled to a slide assembly 50. Slide assembly 50 can be any linear motion system which can provide linear movement of extension panel 28. In one embodiment, slide assembly 50 rides along a track 52 to permit extension panel 28 to move between a retracted position, where extension panel 28 is housed within side wall 23, and an extended position, where extension panel 28 is extended rearwardly.

Figure 4B:
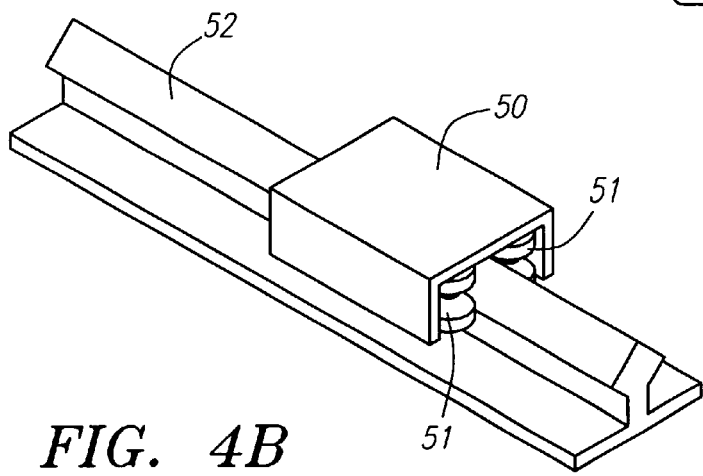
FIG. 4B is a simplified perspective view of the slide assembly of FIG. 4A.
Figure 4A:
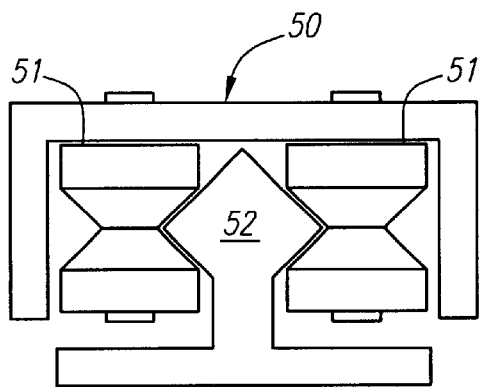
FIG. 4A is a simplified front view of an embodiment of a slide assembly in accordance with the present invention.

FIGS. 4A and 4B are illustrations of one type of slide assembly 50 in accordance with the present invention. In this example, slide assembly 50 includes a pair of rollers 51 which can be made to engage track 52. In one embodiment, slide assembly 50 is mounted to a bottom portion of extension panel 28. Track 52 can be diamond shape to engage more than one surface of the pair of rollers 51. In this manner, extension panel 28 should be free from binding as it moves along track 52. Track 52 extends along the length of extension panel 28 such that slide assembly 50 mounted to panel 28 engages track 52 during the entire movement of panel 28.

Figure 8:
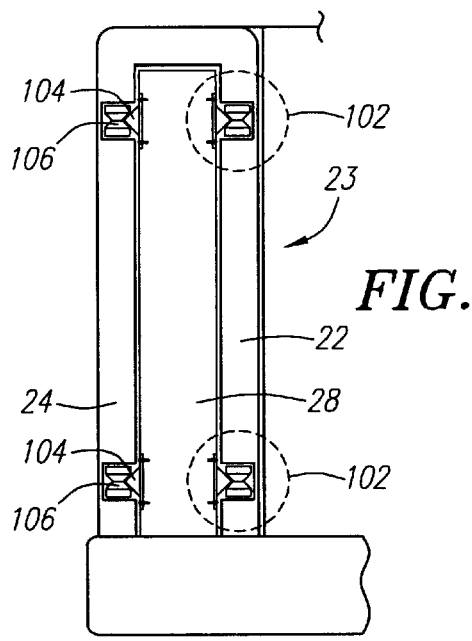
FIG. 8 is a simplified illustrations of another embodiment of the slide assembly of FIGS. 4A and 4B.

In an alternative embodiment, as shown in FIG. 8, a plurality of slide assemblies 102 can be mounted to the internal walls and external walls of side walls 23 and 25. For example, two slide assemblies can be mounted on oppositely facing panels at the top and bottom of side wall 23. In this example, slide assemblies 102 are mounted such that rollers 104 are recessed within the oppositely facing panels. Track 106 can be mounted to corresponding positions on extension panel 28. Accordingly, as extension panel 28 is made to move between a retracted position and an extended position, extension panel 28 can be supported to ride along ride along slide assemblies 102.

Examples of other slide assemblies and linear motion systems suitable for use with the present invention are well known by one of ordinary skill in the art and are generally commercially available.

Referring now to FIGS. 5A, 5B, and 7A, in a non-extended configuration, tailgate assembly 32, operates primarily as a conventional tailgate. Tailgate assembly 32 includes a first tailgate 34 and a second tailgate 36. First tailgate 34 can be pivotally coupled to a wall of the truck bed, such as bottom wall 19, using conventional pivoting means 21, such as a hinge. First tailgate 34 is generally rectangular shaped and formed of sheet metal or other similar rigid material. First tailgate 34 has an internal side 56, an external side 58, two side edges 60 therebetween, a top edge 64, and a bottom edge 65.

In one embodiment, two channels 66 and 68 are formed internal to first tailgate 34. Channels 66 and 68 extend from bottom edge 65 to top edge 64. Channels 66 and 68 are configured to receive a roller device 70. A cap 73 (FIG. 6) can be placed over channels 66 and 68 to protect the components and the user.

In one embodiment, second tailgate 36 is generally rectangular in structure with a hollow interior. Second tailgate 36 is slidingly coupled to first tailgate 34 via roller device 70. As best understood with reference to FIG. 6, roller device 70 includes a pair of rollers 71, having an axle 72 therebetween. A connector member 74 is rotatably coupled to axle 72 at one end and attached to second tailgate 36 at the other end. Second tailgate 36 can be manually manipulated to slide relative to first tailgate 34. As illustrated in FIG. 5B, bottom edge 76 of second tailgate 34 reaches top edge 64 of first tailgate 34 once second tailgate 36 is fully extended. Connector member 74 rotates a second tailgate 36 is lifted to rotate to an upright orientation and provide a closure.

Figure 7B:
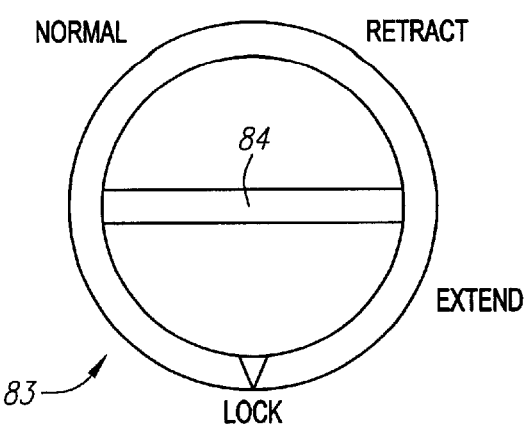
FIG. 7B is a simplified perspective view of a control handle in accordance with the present invention.

Referring now to FIGS. 7A and 7B, shown is a latch means 80, which primarily controls operation of tailgate assembly 32. Latch means 80 can be formed on the internal side 56 of first tailgate 34. Latch means 80 is operable through a central rotatable capstan 83 connected to symmetrically opposed rods 82 extended outwards therefrom towards each side edge 60. Each rod 82 is spring-loaded and mateable within a latch slot 86 formed on opposed internal surfaces of extension panels 28 and 30 near the tailgate end of the truck bed 14 (see FIGS. 1B and 1C). As shown in FIG. 7B, capstan 83 is actuable through a handle 84. Handle 84 is rotatable in one orientation for extending the spring-loaded rods 82 for mating within latch slots 86 to thereby secure first tailgate 34 to extension panels 28 and 30. Handle 83 is rotatable in another orientation for retracting the spring-loaded rods 82 from latch slots 86 and thereby release first tailgate 34 from extension panels 28 and 30.

Figure 1D:
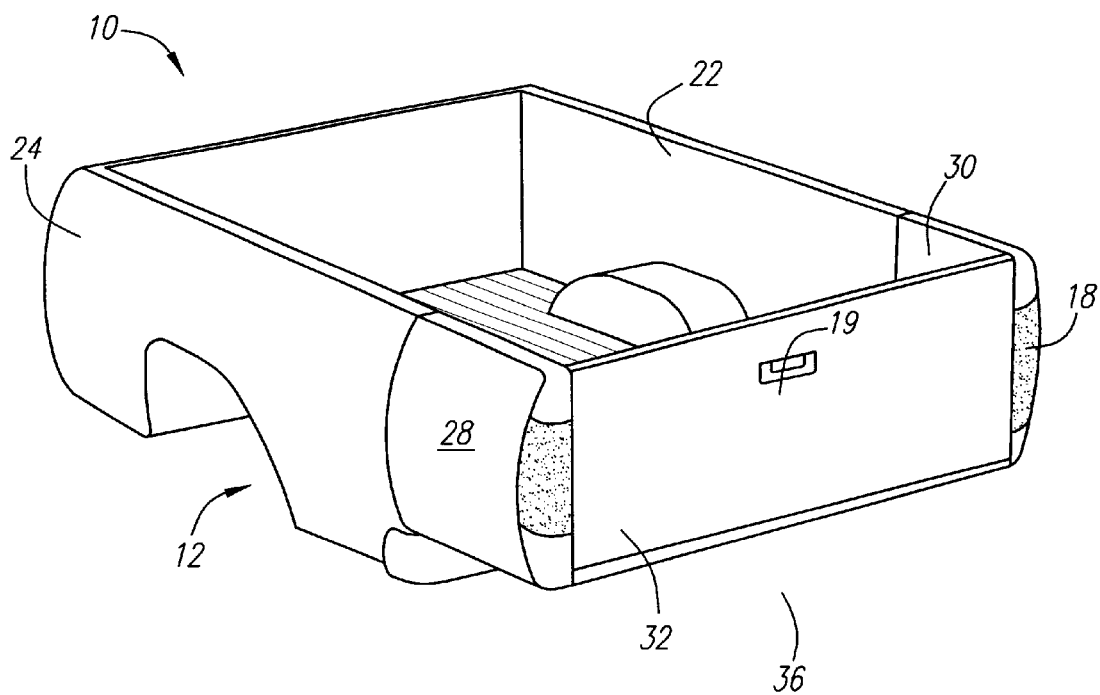
FIG. 1D is a simplified perspective view of the truck bed in a fully extended position with tailgate up in accordance with an embodiment of the present invention.

In operation, as best understood with reference to FIGS. 1A–1D, extension system 10 is engaged using latch means 80 (FIG. 7A). When rods 82 are engaged with extension panels 28 and 30, rotation or opening of tailgate assembly 32 causes each panel 28 and 30 to slide out from its housed position within hollow portion 26 (FIG. 1B). Extension panels 28 and 30 continue to extend in the direction of arrow 42 until tailgate assembly 32 has been fully opened (FIG. 1C). Since first tailgate 34 of tailgate assembly 32 is hingedly coupled to bottom wall 19 of truck bed 14, first tailgate 34 provides a floor 46 between the extended panels 28 and 30. In this embodiment, second tailgate 36 can be further extended with respect to first tailgate 34 (FIG. 1C) to provide a closure when rotated to an upright position (FIG. 1D).

Figure 9A:
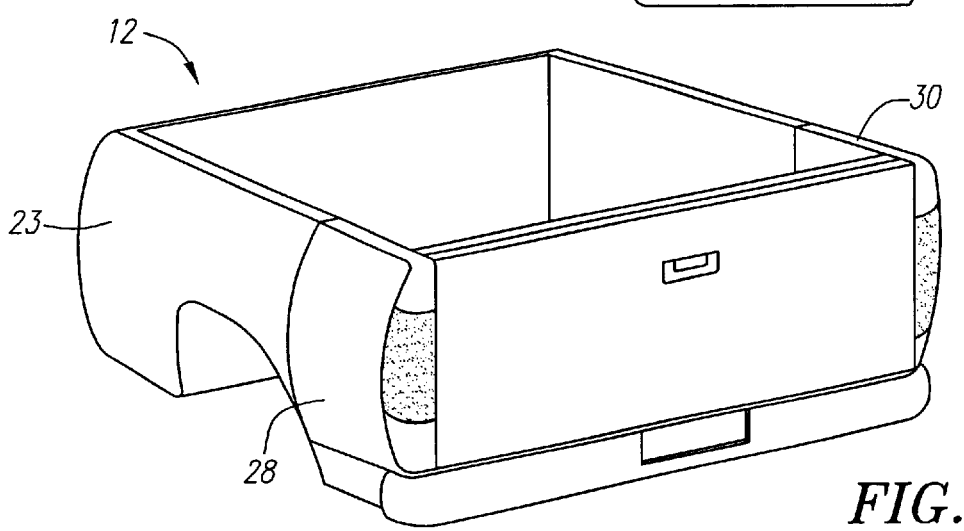
FIGS. 9A–9B are illustrations of another embodiment of the truck bed extender of the present invention.
Figure 9B:
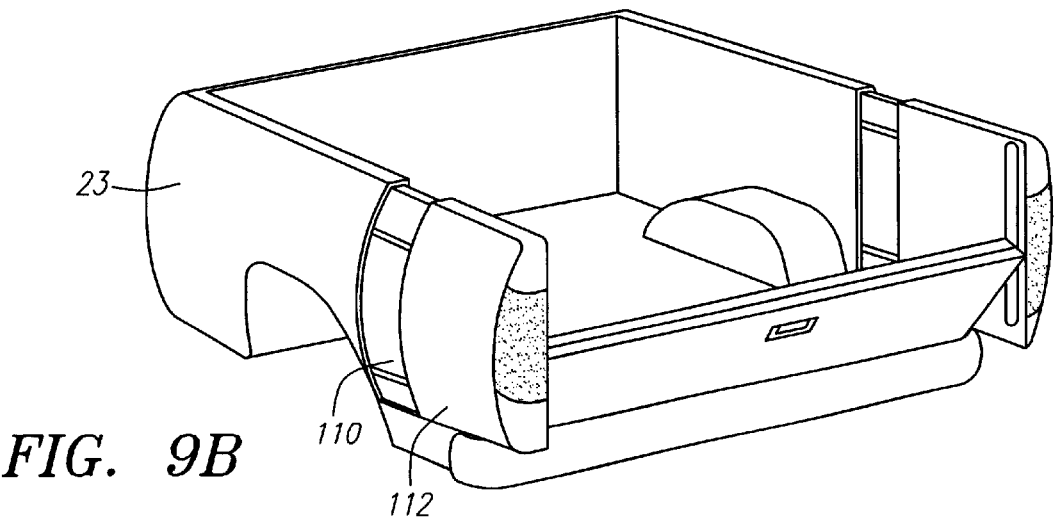

FIGS. 9A–9B illustrate an alternative embodiment of the present invention. The description of extension panels 28 and 30 is directed to only one side of extension assembly 12 (e.g. side wall 23), with reference to the other side, only when necessary to describe a feature of the invention, since it is understood that the other extension panel is structurally and functionally the same. In accordance with the alternative embodiment, as shown in FIG. 9B, extension panel 28 includes an internal portion 110 and an external portion 112. Internal portion 110 of extension panel 28 is slidable within side wall 23, such that panel 28 is removably insertable and housed in hollow portion 26 (FIG. 1A). External portion 112 remains outside of hollow portion 26. External portion 112 may be formed having a shape, color and other features which correspond to the shape, color and other features of side wall 23, such that in the retracted position, external portion 112 completes the external appearance of side wall 23.

In this alternative embodiment, the movement of internal portion 110 within side wall 23 can be facilitated using side mounted slide assemblies, such as those described in FIG. 8.

With respect to the above description then, it is to be realized that the optimum dimensional relationships for the parts of the invention, to include variations in size, materials, shape, form, function and the manner of operation, assembly and use, are deemed readily apparent and obvious to one of ordinary skill in the art, and all equivalent relationships to those illustrated in the drawings and described in the specification are intended to be encompassed by the present invention. The description of the invention given above is provided for purposes of illustration and is not intended to be limiting. The invention is set forth in the following claims.

What is claimed is:

1. A truck bed extension assembly for extending a bed of a truck comprising:
   a first panel;
   a second panel, each panel being moveable between a first position where each of said panels is disposed within a side wall of a truck bed and a second position where each said panels is extended out from within said side wall;
   a first tailgate moveable between a closed position where said first tailgate provides a closure and an open position where said first tailgate provides said extended floor; and
   a second tailgate slidably coupled to said first tailgate, said second tailgate configured to provide a closure when said first tailgate is in said open position.

2. The truck bed extension assembly of claim 1, further comprising slide assemblies, each slide assembly slidably engaged with each panel permitting each panel to move between said first and said second positions.

3. The truck bed extension assembly of claim 1, wherein each of said slide assemblies comprises a pair of side rollers each positioned in contact with a raceway.

4. The truck bed extension assembly of claim 1, further comprising a releasable latch means for releasably securing said tailgate assembly in an upright orientation; and when said tailgate assembly is an open orientation, said releasable latch means allows said tailgate assembly to extend an extender tailgate, said extender tailgate moveable between an open and a closed orientation.

5. The truck bed extension assembly of claim 1, wherein each of said panels comprises at least one safety lamp.

6. A truck bed extension system, comprising:
   a truck bed having a front wall, a bottom wall, and oppositely facing side walls;
   a tailgate assembly hingedly coupled to one or more of said walls of said truck bed; and
   a pair of extendable panels, each panel being movable between a retracted position disposed within each side wall and an extended position extending rearwardly from the side walls; said tailgate assembly including a tailgate and a tailgate extender, said tailgate extender configured to extend rearwardly relative to said tailgate, said tailgate extender being pivotally attached to said tailgate when extended to rotate relative to said tailgate between an open and a closed position.

7. The truck bed extension system of claim 6, further comprising slide assemblies disposed within said side walls, each slide assembly slidably engaged with each panel permitting each panel to move between said retracted and said extended positions.

8. The truck bed extension system of claim 7, wherein each of said slide assemblies comprises a pair of rollers each positioned in contact with a track, wherein said track is formed within said side walls.

9. The truck bed extension system of claim 6, further comprising a releasable latch means for releasably securing said tailgate assembly in an upright orientation; and when said tailgate assembly is in an open orientation, said releasable latch means allows said tailgate to extend an extender tailgate, said extender tailgate moveable between a retracted position and an extended position and rotatable between an open and a closed orientation.

10. The truck bed extension system of claim 6, wherein each of said panels comprises at least one safety lamp.

11. A method for extending a truck bed having a front wall, a bottom wall, and oppositely facing side walls, said method comprising:
   sliding a pair of extendable panels telescopically movable between a retracted position disposed within each side wall and an extended position extending rearwardly from the side walls;
   actuating a tailgate hingedly coupled to said bottom wall to form an extended bottom wall portion; and
   extending a tailgate extender slidingly engaged with said tailgate.

12. The method of claim 11, further comprising rotating said tailgate extender between an open and a closed orientation.

13. The method of claim 11, wherein each of said panels is extendable approximately the distance of said lowered tailgate.

14. The method of claim 11, wherein each panes comprises at least one safety lamp mounted to each of said panels, wherein said at least one safety lamp moves with each of said panels.

\* \* \* \* \*